United States Patent

[11] 3,555,293

| [72] | Inventors | Bill M. Shannon<br>Rochester;<br>James R. Kotala, Aliquippa, Pa. |
|---|---|---|
| [21] | Appl. No. | 813,473 |
| [22] | Filed | Apr. 4, 1969 |
| [45] | Patented | Jan. 12, 1971 |
| [73] | Assignee | Westinghouse Electric Corporation<br>Pittsburgh, Pa.<br>a corporation of Pennsylvania |

[54] BUS DUCT
10 Claims, 8 Drawing Figs.

[52] U.S. Cl. ..................................... 307/147,
174/68, 174/88
[51] Int. Cl. ..................................... H01b 7/34,
H02g 3/28

[50] Field of Search .......................................... 174/68B,
71B, 72B, 88B, 99B; 339/22B; 307/147

[56] References Cited
UNITED STATES PATENTS

| 2,955,147 | 10/1960 | Carlson | 174/88BX |
| 3,213,300 | 10/1965 | Davis | 307/147 |

Primary Examiner—Darrell L. Clay
Attorneys—A. T. Stratton, Clement L. McHale and W. A. Elchik ABSTRACT: Improved three-phase four-wire half-neutral bus duct construction. A set of bus bars is supported in a housing in four layers with three phase-carrying bus bars occupying three layers and at least two additional bus bars occupying the fourth layer.

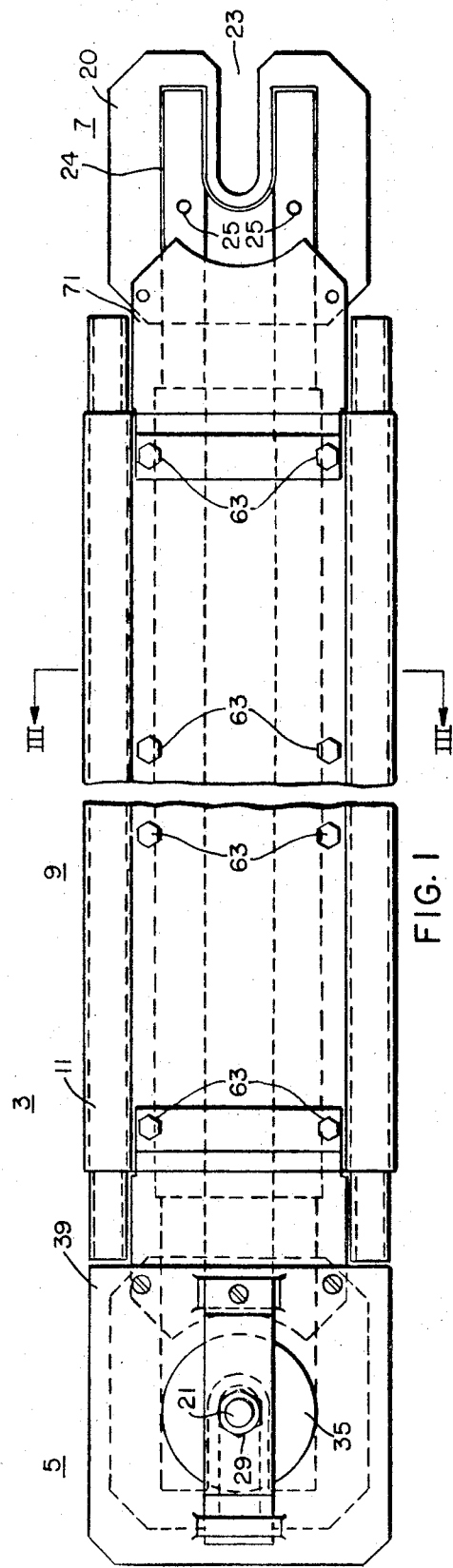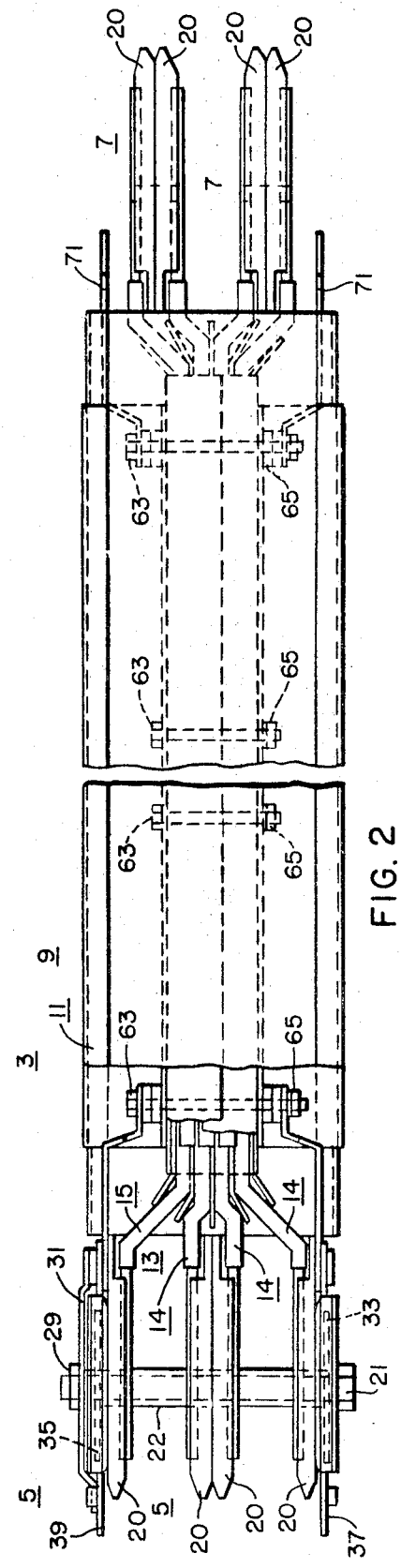

3,555,293

BUS DUCT

CROSS REFERENCES TO RELATED APPLICATIONS

Similar bus duct constructions are disclosed in the patents to Charles L. Weimer et al., Pat. No. 3,444,311 issued May 13, 1969 and U.S. Pat. No. 3,459,872 issued Aug. 5, 1969.

BACKGROUND OF THE INVENTION

1. Field of the Invention

Bus duct, and more particularly three-phase, four-wire, half-neutral bus duct.

2. Description of the Prior Art

For certain bus duct applications, a three-phase four-wire full-neutral system is provided with the full-neutral bus bar having the same cross-sectional area as each of the phase-carrying bus bars, and a three-phase four-wire half-neutral system is provided with the half-neutral bus bar having 50 percent of the cross-sectional area of each of the phase-carrying bus bars. It is old in the art to provide such a three-phase four-wire half-neutral bus duct system with a single half-neutral bus bar having the same width dimension of each of the phase-carrying bus bars and one-half of the thickness dimension of each of the phase-carrying bus bars.

An object of this invention is to provide an improved three-phase four-wire half-neutral bus duct construction wherein the half-neutral service comprises a plurality of separate bus bars, preferably two, with the thickness dimensions of the half-neutral bus bars being the same as the thickness dimension of the full-neutral bus bar, whereby the three-phase four-wire half-neutral bus bars can be supported in the same housing construction that supports the three-phase four-wire full-neutral bus bars.

Another object of this invention is to provide improved three-phase four-wire half-neutral bus duct comprising a set of bus bars supported in a compact sandwiched relationship between oppositely disposed housing parts with the half-neutral service being provided by means of a plurality of separate bus bars positioned in one layer of a four-layer bus duct construction.

Another object of this invention is to provide improved three-phase four-wire half-neutral bus duct comprising sets that are connected in an end-to-end relationship by means of a single bolt construction with the half-neutral service being provided by means of a plurality of bus bars disposed in a common layer of a multilayer bus duct construction.

A further object of this invention is to provide improved three-phase four-wire half-neutral bus duct with an internal ground wherein the internal ground and half-neutral services are provided by means of two separate bus bars positioned in the same layer of a multilayer construction.

A further object of this invention is to provide an improved three-phase four-wire half-neutral bus duct construction with an internal ground, which bus duct comprises a plurality of bus bars supported in a multilayer compact sandwiched relationship between oppositely disposed housing parts wherein the internal ground and half-neutral services are provided by means of two separate bars disposed in a common layer of the multilayer construction.

A further object of this invention is to provide an improved three-phase four-wire half-neutral bus duct construction with an internal ground wherein the bus duct comprises a plurality of sections connected in an end-to-end relationship by means of a single bolt construction and wherein the internal ground and half-neutral services are provided by means of separate bus bars positioned in a common layer of a multilayer assembly.

SUMMARY OF THE INVENTION

There is provided, by this invention, an improved three-phase, four-wire, half-neutral bus duct construction. The bus duct is of the type comprising elongated sections connectable in an end-to-end relationship at the insulation. Each section comprises a set of bus bars supported in a multilayer compact sandwiched relationship between a first pair of oppositely disposed housing parts that cooperate with a second pair of oppositely disposed housing parts to enclose the bus bars. The set of bus bars comprises three phase-carrying bus bars, each of which occupies a separate layer of a four-layer construction, and a plurality of additional bus bars that occupy the fourth layer. In one embodiment the additional bus bars provide half-neutral service for a three-phase four-wire half-neutral system, and in the other embodiment the fourth layer comprises a half-neutral bus bar and a ground bus bar for a three-phase four-wire half-neutral internal grounded system. In both embodiments, the sets of bus bars of two sections are connectable in an end-to-end lapped relationship by means of a one-bolt joint construction.

BRIEF DESCRIPTION OF THE DRAWINGS

FIG. 1 is a top plan view, with parts broken away, of a section of bus duct constructed in accordance with principles of this invention;

FIG. 2 is a side view, with parts broken away, of the bus duct section seen in FIG. 1;

DESCRIPTION OF THE PREFERRED EMBODIMENTS

Figure 4:
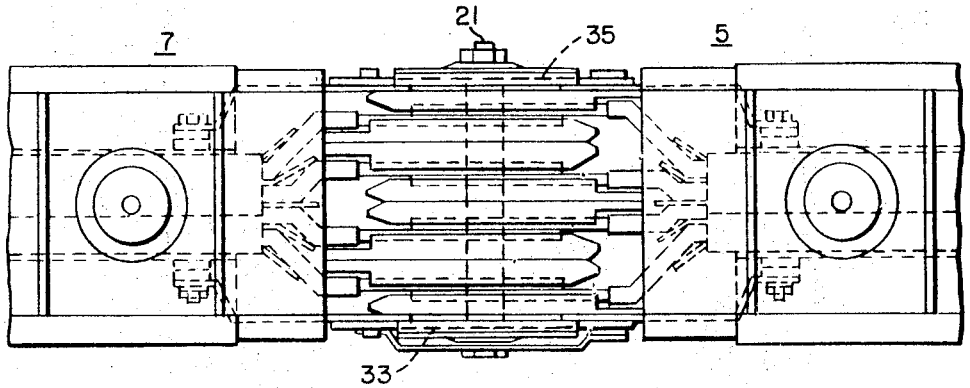
FIG. 4 is a side view, with parts broken away, illustrating an end-to-end lap type connection between two of the sections illustrated in FIGS. 1 –3.
Figure 3:
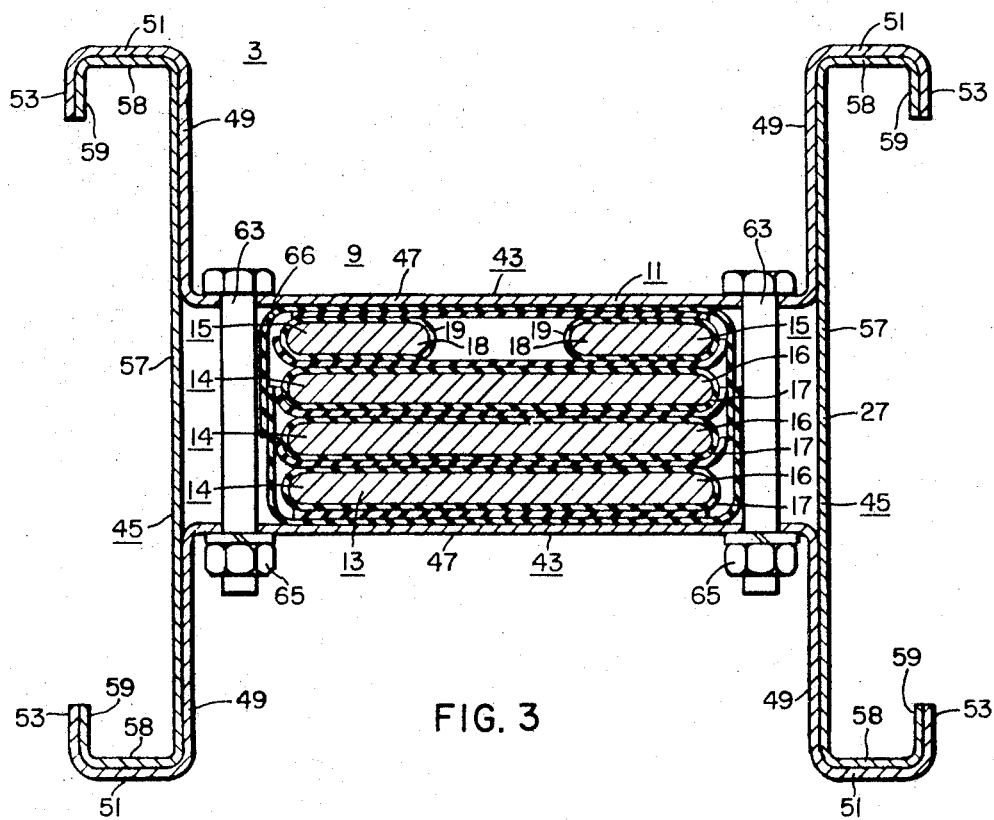
FIG. 3 is a sectional view taken generally along the line III–III of FIG. 1.

Referring to the drawings, there is shown, in FIGS. 1–3, an elongated section 3 of bus duct. The section 3 comprises a connecting end part 5 at one end thereof, a connecting end part 7 at the other end thereof, and a main body part 9 intermediate the connecting end parts 5 and 7. The section 3 comprises a housing structure 11 and a set 13 of bus bars supported in the housing structure 11. As can be understood with reference to FIGS. 2 and 3, the bus bars are sandwiched together in a compact relationship at the main body part 9 of the section, and they are offset at the opposite ends 5, 7 of the section to enable connection of the section to a similar section. The set 13 (FIG. 3) of bus bars comprises three phase-carrying bus bars 14 and two additional bus bars which are neutral bus bars 15. Each of the phase-carrying bus bars 14 comprises a conducting bar 16 and an insulating sleeve 17. Each of the neutral bus bars 15 comprises a conducting bar 18 and an insulating sleeve 19. The insulating sleeves 17 and 19 are of the type more specifically described in the copending application of Charles L. Weimer Ser. No. 803,230, filed Feb. 28, 1969 and assigned to the assignee of the instant application. As can be seen in FIG. 2, each of the insulating sleeves 17, 19 terminates short of the opposite ends of the associated bus bar to provide uninsulated end portions to permit connection of the bus bars to bus bars of a similar section in an overlapping relationship (FIG. 4).

The housing structure 11 is of the type specifically described in the patent to Charles L. Weimer and Bill M. Shannon, U.S. Pat. No. 3,444,311 assigned to the assignee of the instant application.

A plurality of rigid molded insulating members 20 (FIGS. 1 and 2) are supported at the ends of the bus bars. A bolt 21 and insulating tube 22 extend through openings in the bus bars 14, and between the spaced bus bars 15, and through openings in the insulators 20 at the connecting end part 5. The insulators 20 are provided with aligned slots 23 (FIG. 1) therein at the other connecting end part 7 of the section. The insulators 20 are of the type more specifically described in the patent to Charles L. Weimer et al., U.S. Pat. No. 3,459,872. Each of the insulators 20 is provided with a U-shaped depression or notch 24. The two bus bars 15 are positioned in the opposite legs of the notch 24 of the associated insulator 20, and each of the bus bars 14 is provided with a slot therein at the connecting end part 7 with the opposite legs of each of the bus bars 14 fitting in the notch of the associated insulator 20. As can be seen in FIG. 1, each of the insulators 20 comprises a pair of molded insulating projections 25 with each of the projections 25 extending through a suitable opening in the associated bus bar for capturing the insulator in place at the connecting end part 7. At the installation, the connecting end part 7 of one section is moved into a connecting position cooperating with the connecting end part 5 of a similar section with the bus bars and insulators at the connecting end part 7 straddling the bolt 21 and insulating tube 22, of the connecting end part 5 and with each bus bar of one section being in a lapped relationship with the associated bus bar of the other section, and with the rigid insulators spacing the pairs of connected bus bars. When the sections are in the connecting position, the bolt 21 can be rotated while a nut 29 is held against rotation by a lock member 31. This operation draws a pair of spring washers 33 and 35 toward each other to thereby draw the opposite housing parts 37 and 39 toward each other to thereby sandwich the rigid insulators 20 and bus bars 14, 15 together to physically and electrically connect the bus bars of the sections. The means for connecting the similar sections together is more specifically described in the above-mentioned patent to Charles L. Weimer et al. U.S. Pat. No. 3,459,872.

The construction of the main body part 9 of the bus duct section will be best understood with reference to FIG. 3. As can be seen in FIG. 3, the phase-carrying bus bars 14 are generally flat members supported in an aligned stacked mutually flatwise face-to-face relationship in three layers of the four-layer construction, and the fourth layer is occupied by the generally flat bus bars 15 which are positioned in a spaced relationship occupying the fourth layer which is aligned with the other three layers. The housing structure 11 comprises a first pair of sheet metal members 43 and a second pair of sheet metal members 45. Each of the housing members 43 is a generally U-shaped structure comprising a planar bight part 47 and a pair of flat planar opposite main leg parts 49 extending from the bight part 47 generally normal to the plane of the bight part 47. Each of the main leg parts 49 is bent over near the upper end thereof to form a flat planar outer leg part 51 extending outwardly from the associated part 49, and the parts 51 are bent over to provide downwardly extending end parts 53 that extend downward parallel to the main leg parts 49. As can be seen in FIG. 3, each of the housing members 43 is an integral sheet metal member bent over to form the parts 47, 49, 51 and 53.

Each of the housing members 45 of the second pair of opposite housing members, at the main body part 9 of the bus duct section, is a generally C-shaped sheet metal member. Each of the members 45 comprises a flat planar bight part 57 bent over at the opposite ends thereof to provide parallel leg parts 58 which are bent over at the free ends thereof to provide end leg parts 59 that extend generally parallel to the associated bight part 57. As can be seen in FIG. 3, the opposite housing members 45 are positioned between the opposite housing members 43 in a nested relationship. The parts 43, 45 can be connected against relative longitudinal movement by welding or other securing means.

A plurality of pairs of bolt members 63 are passed through suitable openings in the opposite housing members 43, and nut members 65 are tightened onto the bolt member 63 to draw the housing members 43 toward each other to tightly draw the bus bars 14, 15 between the bight portions 47 of the housing members 43 in a compact sandwiched relationship. With the bight portions 47 of the housing members 43 drawn against the insulated bus bars 14, 15, heat is conducted to the housing members 43. The surfaces of the housing members 43 provide large surface areas for the dissipation of the heat into the surrounding air. The housing members 43 close off two opposite sides of the set of bus bars and the housing members 45 close off the other two opposite sides to completely enclose the set of bus bars at the main body part 9 of the bus duct section. As can be seen in FIG. 3, a separate additional insulating sheet member 66 is provided around the set of bus bars. The bus bars 14, 15 may be insulated in a manner more specifically described in the application of Charles L. Weimer, Ser. No. 803,230 filed Feb. 28, 1969.

As can be seen in FIGS. 1 and 2, a pair of housing members 37, 39 are suitably secured to the main body part 9 of the bus duct section by means of two bolts 63. The housing members 37, 39 are provided at the connecting end part 5, and additional housing members 71 are secured to the main body part 9 of the bus duct section by means of two bolts 63 at the connecting end part 7. The housing parts 37, 39 and 71 cooperate with housing parts of similar sections to enclose the offset bus bars at the connections in a manner more specifically described in the above-mentioned copending patent to Charles L. Weimer et al., U.S. Pat. No. 3,459,872.

Referring to FIG. 4, it will be understood that when two sections of bus duct are to be connected in an end-to-end relationship, at least one of the sections is move to move longitudinally relative to the other section to move the bus bars and insulators of the sections into an overlapping relationship. The aligned bus bar and insulating member slots (FIG. 1) of the connecting end part 7 of one section receives the bolt 21 and insulating tube 22 that are supported on the connecting end part 5 of the other section. The parts of two sections are shown in FIG. 4 in the connected position with the connecting end part 7 of one section connected to the connecting end part 5 of the similar section. In the connected position, the plate 39 of one section laps the plate 71 of the similar section and the plate 37 of the one section laps the other plate 71 of the similar section to close off the front and back of the housing structure at the connection. Suitable cover means are applied to close off the opposite sides which are open as seen in FIG. 4. When the sections are in the position seen in FIG. 4, the nut 21 and bolt 29 are tightened applying pressure to the opposite spring washers 33, 35 which are drawn inwardly toward each other. The plates 37, 39, 71 flex slightly to permit the tightening operation and the bus bars are sandwiched together in a tight operation and the bus compact relationship to physically and electrically connect each of the conducting bars of one section with the associated conducting bar of the other section. As was previously described, the conducting bars fit in the associated notches 24 (FIG. 1) of the associated insulating member 20 with the depth of the notches in the insulating members 20 being leas less than the dimension of the associated conducting bars so that each of the conducting bars will engage another conducting bar in a lapped relationship at the connection. The spring washers 33, 35 provide contact pressure between the connected bus bars. As can be understood with reference to FIG. 2, the bus bars are offset at the opposite ends in such a manner as to permit the ends of the similar sections to a mate properly when the connecting end part 5 of one section is connected to the connecting end part 7 of the other section.

Figure 5:
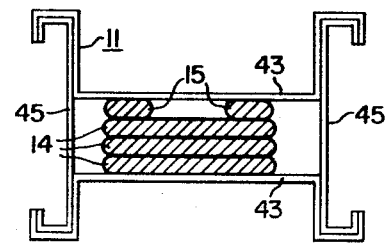
FIG. 5 is a schematic view similar to FIG. 3 illustrating the construction of the bus duct of FIGS. 1–3.
Figure 6:
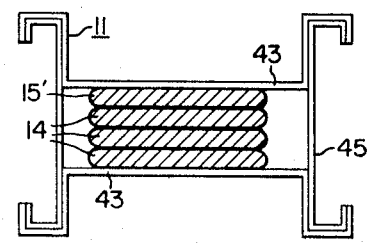
FIG. 6 is a view similar to FIG. 5 of a prior art three-phase four-wire full-neutral section of bus duct.

Referring to FIGS. 5 and 6, there is shown, in FIG. 5, a schematic view of the three-phase four-wire half-neutral bus duct disclosed in FIGS. 1—4, and a prior art three-phase four-wire full-neutral section of bus duct is illustrated schematically in FIG. 6. As can be understood with reference to FIGS. 5 and 6, the main body part housing construction is the same in both of these FIGS. and as can be understood from the hereinbefore set forth description, the one-bolt connecting means for connecting the similar sections of bus duct is essentially the same in the three-phase four-wire half-neutral construction and the three-phase four-wire full-neutral construction. In the prior art construction disclosed in FIG. 6, the full-neutral bus bar 15', which is aligned with the stacked phase-carrying bus bars 14, occupies one layer of the four-layer construction seen in FIG. 6. As can be understood with reference to FIG. 5, the two half-neutral bus bars 15 provide a cross section of 50 percent of the cross section of the full-neutral bus bar 15' seen in FIG. 6. By providing two-neutral bus bars 15 in a spaced relationship as shown in FIG. 5, the thickness dimension of the neutral layer of the four-layer construction remains the same whereby the construction of the housing 11 need not be changed for the half-neutral service, and only the amount of conducting material necessary for the half-neutral service is supplied with the half-neutral construction. With each of the half-neutral bus bars 15 being spaced in one layer of the multilayer construction and fitting in the associated slots in the associated insulators 20, the same insulating members 20 (FIGS. 1 and 2) as are used with the three-phase four-wire half-neutral bus duct system are utilized in the three-phase four-wire half-neutral system, and the same one-bolt joint construction that is utilized in the three-phase four-wire full-neutral system is utilized in the three-phase four-wire half-neutral system.

Figure 7:
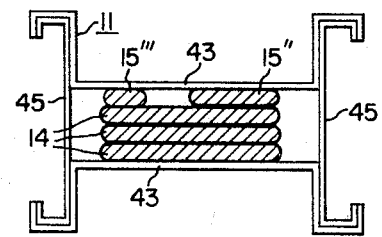
FIG. 7 is a view similar to FIG. 5 illustrating a three-phase four-wire half-neutral internal grounded construction which is another embodiment of this invention.
Figure 8:
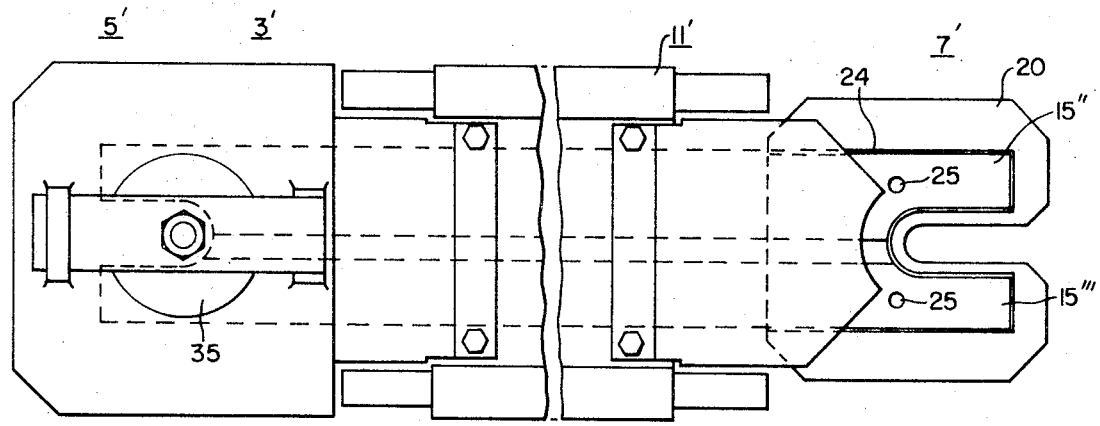
FIG. 8 is a top plan view, with parts broken away, of the bus duct section of the embodiment of FIG. 7.

Another embodiment of the invention is illustrated in FIGS. 7 and 8 wherein the construction of the bus duct section 3' (FIG. 8) is the same as was hereinbefore described with reference to FIGS. 1—5 except for the construction of the bus bars 15" and 15'''. The service provided in the FIGS. 7 and 8 embodiment is a three-phase four-wire half-neutral service with an internal ground. As can be understood with reference to FIG. 7, the single-insulated half-neutral bus bar 15" is provided with a cross-sectional area of 50 percent of that of the full neutral bus bar 15' seen in FIG. 6, and an uninsulated internal ground 15''', which has a cross-sectional area of 25 percent of that of one of the phase-carrying bus bars 14, is mounted within the housing in a spaced relationship from the half-neutral bus bar 15". The half-neutral bus bar 15" is insulated in the same manner as the phase-carrying bars. The internal ground bar 15''' is an uninsulated bus bar in physical electrical contact with the metallic housing to provide the internal ground service. As can be understood with reference to FIG. 8, the half-neutral bus bar 15" is provided with an end portion that fits within the associated notch 24, and an opening is provided for receiving the associated projection 25 of the associated insulating member 20. The internal ground bus bar 15''' fits within the associated notch 24 and is provided with an opening for receiving the associated projection 25 of the associated insulating member 20. The housing construction 11 is the same as that hereinbefore described with reference to FIGS. 1—5, and the one-bolt construction and connecting means along with the insulators 20, are the same as that hereinbefore described with reference to FIGS. 1—5. With reference to FIG. 7, it will be noted that the one layer of the four-layer construction comprises the insulated single half-neutral bus bar 15" and the uninsulated single internal ground bar 15''' which bus bars are aligned in a stacked relationship with the phase-carrying bus bars 14, and which bus bars would be connected with associated bus bars of a similar section by means of the previously described one-bolt connection. When the bolts 21 and unit 29 are tightened to draw the housings and bus bars into a compact sandwiched relationship, the housing material will flex sufficiently to provide a good physical and electrical pressure connection between the one housing part 43 and the internal ground 15'''.

We claim:

1. A section of bus duct comprising an elongated housing, a set of elongated bus bars supported in said housing, said bus bars of said set comprising three elongated phase-carrying bus bars and at least two elongated additional bus bars, said section comprising a main body part intermediate the ends thereof, said bus bars of said set at said main body part being positioned in a stacked relationship comprising four layers with each of said three phase-carrying bus bars occupying a separate one of said layers and with said two additional bus bars occupying the fourth of said layers, said housing at said main body part comprising a main body part housing construction, said main body part housing construction comprising a first pair of oppositely disposed housing parts, at said main body part means drawing said first pair of oppositely disposed housing parts toward each other against the outer layers of said four layers four to draw said four layers toward each other into a compact sandwiched relationship.

2. A section of bus duct according to claim 1, each of said elongated bus bars being generally flat and having in cross section a widthwise dimension and a thickness dimension, and the combined widthwise dimensions of said additional bus bars in said fourth layer being less than the widthwise dimension of each of said phase-carrying bus bars.

3. A section of bus duct according to claim 2, said additional bus bars being exactly two bus bars, each of said phase-carrying bus bars at said main body part comprising a conducting bar and an insulating sleeve on the conducting bar, a first of said additional bus bars at said main body part comprising a conducting bar and an insulating sleeve on the conducting bar, and the second of said additional bus bars at said main body part being uninsulated and in electrical contact with one of said housing parts to provide an internal ground in said section of bus duct.

4. A section of bus duct according to claim 3, and the thickness dimension of said first additional bus bar being the same as the thickness dimension of each of said phase-carrying bus bars.

5. A section of bus duct according to claim 1, said additional bus bars being exactly two bus bars occupying said fourth layer in a spaced relationship, said fourth layer being an outer layer adjacent one of said housing parts.

6. A section of bus duct according to claim 5, each of said phase-carrying bus bars at said main body part comprising a phase-carrying conducting bar and an insulating sleeve on said phase-carrying conducting bar, each of said additional bus bars at said main body part comprising a neutral conducting bar and an insulating sleeve on said neutral conducting bar, and the thickness dimension of each of said additional bus bars being substantially the same as the thickness dimension of each of said phase-carrying bus bars.

7. A first section of bus duct according to claim 1, said first section comprising a first connecting end part, said additional bus bars of said first section being exactly two bus bars, a second section of bus duct according to claim 1, said second section comprising a second connecting end part, said additional bus bars of said second section being exactly two bus bars, the bus bars of the set the bus bars of the set of said first section at said first connecting end part and the bus bars of the set of said second section at said second connecting end part being offset to provide spacing for a lap-type connection having insulating spacing means between adjacent connected bus bars of adjacent layers, connecting means connecting said first connecting end part of said set of bus bars of said first section to said second connecting end part of said set of bus bars of said second section in an end-to-end lapped relationship with each phase-carrying bus bar of said set of bus bars of said first section in a lapped relationship with a separate phase-carrying bus bar of said set of bus bars of said second section and with each of said additional bus bars of said set of bus bars of said first section in lapped relationship with a separate additional bus bar of said set of bus bars of said second section, insulating spacing means between adjacent connected bus bars of adjacent layers, said connecting means comprising a single-bolt structure extending through opening means in said phase-carrying bus bars and insulating means and extending generally between said two additional bus bars of each of said sections, said one-bolt structure being tightened to draw said lapped bus bars and said insulating spacing means into a compact sandwiched relationship to physically and electrically connect said sets of bus bars of said sections.

8. Bus duct according to claim 7, in each of said sections said additional two bus bars occupying said fourth layer in a spaced relationship, and said fourth layer in each of said sections being an outer layer adjacent one of said housing parts of the associated section.

9. A section of bus duct according to claim 8, in each of said sections each of said phase-carrying bus bars at the main body part comprising a phase-carrying conducting bar and an insulating sleeve on the phase-carrying conducting bar, in each of said sections each of said additional bus bars at the main body part comprising a neutral conducting bar and an insulating sleeve on the neutral conducting bar, and in each of said sections the thickness dimension of each of said additional bus bars being substantially the same as the thickness dimension of each of the phase-carrying bus bars of the section.

10. A section of bus duct according to claim 7, in each of said sections each phase-carrying bus bar at the main body part comprising a conducting bar and an insulating sleeve on the conducting bar, in each of said sections a first of said additional bus bars at the main body part comprising a conducting bar and an insulating sleeve on the conducting bar, and in each of said sections the second of said additional bus bars being an uninsulated conducting bar in electrical contact with one of the housing parts of the section to provide an internal ground in the section.